United States Patent [19]
Hallerbäck

[11] 3,921,017
[45] Nov. 18, 1975

[54] ELECTRIC MOTOR

[75] Inventor: Stig Lennart Hallerbäck, Vastra Frolunda, Sweden

[73] Assignee: SKF Industrial Trading and Development Company B.V., Jutphaas, Netherlands

[22] Filed: Feb. 19, 1974

[21] Appl. No.: 443,327

[30] Foreign Application Priority Data
Mar. 13, 1973 Sweden .............................. 7303459

[52] U.S. Cl. .................. 310/216; 310/43; 310/112; 310/254
[51] Int. Cl.² .......................................... H02K 1/12
[58] Field of Search ............. 310/43, 191, 209, 254, 310/216–218, 166, 112, 201; 318/243

[56] References Cited
UNITED STATES PATENTS

| | | | |
|---|---|---|---|
| 2,600,523 | 6/1952 | Ellis | 310/166 X |
| 2,629,063 | 2/1953 | Ellis | 310/166 |
| 2,797,376 | 6/1957 | Meade | 310/43 X |
| 2,798,995 | 7/1957 | McLean | 310/43 X |
| 3,017,528 | 1/1962 | Ellis | 310/191 |
| 3,252,027 | 5/1966 | Korinek | 310/201 X |
| 3,497,730 | 2/1970 | Doolittle | 310/166 |
| 3,591,819 | 7/1971 | Laing | 310/259 X |

*Primary Examiner*—Donovan F. Duggan
*Attorney, Agent, or Firm*—Howson and Howson

[57] ABSTRACT

Electric poly-phase motor comprising an annular stator assembly having a rotor cavity and a rotor rotatably mounted in the rotor cavity, said stator assembly comprising a plurality of axially directed, magnetically isolated sections each representing an electric phase and each including a plurality of superimposed laminations having side edge portions generally aligned with the axis of the rotor cavity and turned radially inwardly toward the rotor cavity, said side edge portions being circumferentially spaced relative to one another, windings surrounding the yoke portion of the laminations between the turned in side edge portions and a moulding mass encapsulating the laminations and windings and filling the space between the turned in side edge portions except for the outer terminal ends of said side edge portions.

8 Claims, 6 Drawing Figures

ELECTRIC MOTOR

BACKGROUND OF THE INVENTION

The present invention concerns electric motors and relates particularly to a new stator for such motors.

Conventional motors comprising rotor and stator have a stator which in principle has been built up by laminations arranged in a square angle to the motor axis. The windings are inserted in the laminations. The laminations are attached to each other by suitable means as bolts or the like, and they define a cylindrical cavity for the rotor in their middle. The windings running along all the motor axis has usually been grouped in several systems, and each system is for polyphase motors connected to its specific electric phase. This results in rotation of the magnetic field in the rotor cavity. At three phase motors the phase have a displacement compared to each other of 120° el.

This conventional construction makes the stator complicated and expensive to manufacture, especially on account of the large waste of lamination material when punching. The winding work is also costly. A great deal of the copper material in the winding heads does not effectively participate in the motor work and is accordingly in principle superfluous. For a given output the motor becomes also comparatively big, as the laminations must have a certain minimum outer diameter which is dependent on the flux and the length of the stator teeth.

BRIEF SUMMARY OF THE INVENTION

According to the present invention one has eliminated the above disadvantages and brought about a completely new construction of electric motors, which above all are simple to manufacture but which also have the advantage that the ratio weight/output becomes less, thus attaining a less outer diameter than at conventional motors. One has obtained this by constructing the stator in such a way that it is axially divided into sections, each one representing an electric phase.

It is then possible to make a motor, for instance a three phase motor, where the first third represents one phase, the second third a second phase and the last third a third phase. In another embodiment of the invention the stator may be divided into more sections than the number of phases, each phase then being represented by a plurality of sections remote from each other.

To construct a divided stator as above it is suitable that the laminations in the stator sections are arranged with their sides in the axial direction of the stator having those edge parts running in the axial direction bent inwardly towards the rotor cavity. The laminations are then suitably embedded in and fixed by a moulding mass, such as plastic.

The stator windings may be arranged around the edge parts of the laminations being oriented inwardly towards the rotor cavity, but they may also for practical reasons be arranged around the yoke parts of the laminations.

As the magnetic flux through the rotor due to the construction of the stator will be divided, it is according to the invention possible to obtain a more even, less divided magnetic flux by letting the stator sections partly overlap each other in the axial direction.

The stator sections may be firmly attached to each other, preferably by being molded in plastic, but it can also in some cases by advantageous to arrange them so that they are movable or turnable in relation to each other.

A particularly simple way to produce a shaded pole motor is obtained through the invention. It is possible to let one or, if desired, several sections be the shaded pole, while the other sections together make the salient pole.

In each section it is possible to arrange a plurality of peripheral, after each other following assemblies of laminations. In this way a motor with many poles is obtained.

BRIEF DESCRIPTION OF THE FIGURES

The invention will in the following be described more in detail in connection with the attached drawings in which.

DETAILED DESCRIPTION OF SPECIFIC EMBODIMENTS

Figure 1:
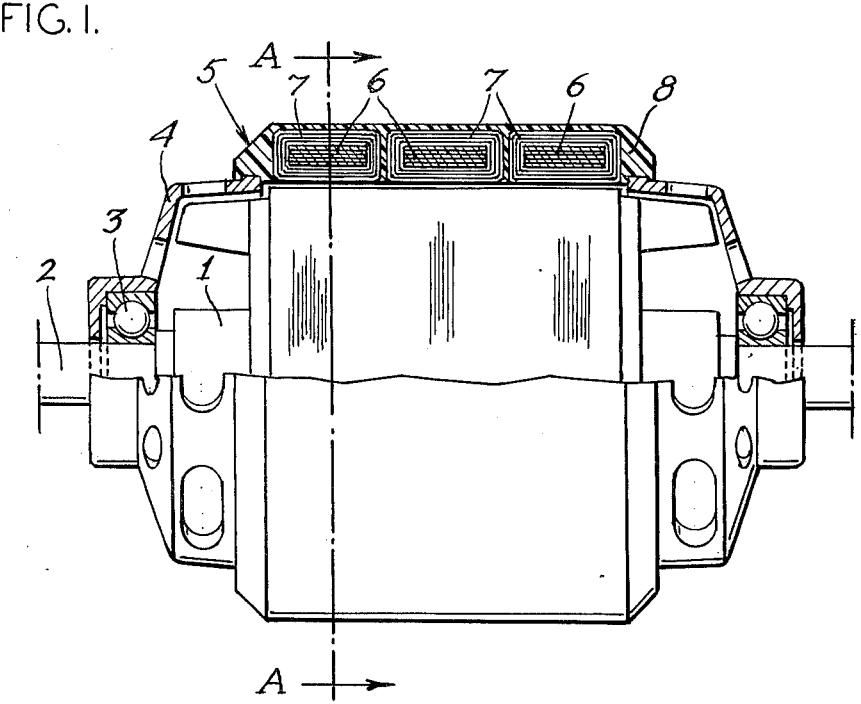
FIG. 1 shows a partial section through a three phase motor.

FIG. 1 shows a three phase motor comprising a rotor 1 that via the axis 2, the bearing 3 and the bearing support 4 is connected to the stator 5 which mainly consists of three lamination assemblies 6 around which the winding 7 are arranged. The stotor may be held together mainly by means of a plastic mass 8, which has been introduced in liquid state and which has penetrated the other stator parts before it was cured. The lamination assemblies 6 of the three sections together with the windings 7 are displaced 120° el compared to each other and each one connected to its own phase.

Figure 2:
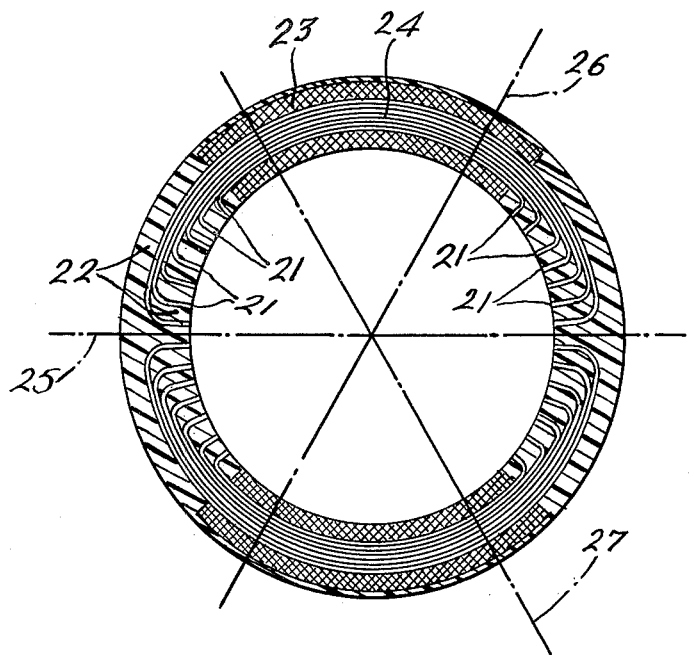
FIG. 2 shows a section along the line A—A in FIG. 1.

In FIG. 2 the edges 21 of the laminations are shown bent inwardly towards the rotor cavity, and they are maintained in position by the plastic mass 22. The windings 23 are arranged around the yoke parts 24 of the laminations. By having the stator sections turned 120° el relatively to each other, the magnetic field will rotate. The lines 25, 26 and 27 denote the relationship between the various phases.

Figure 3:
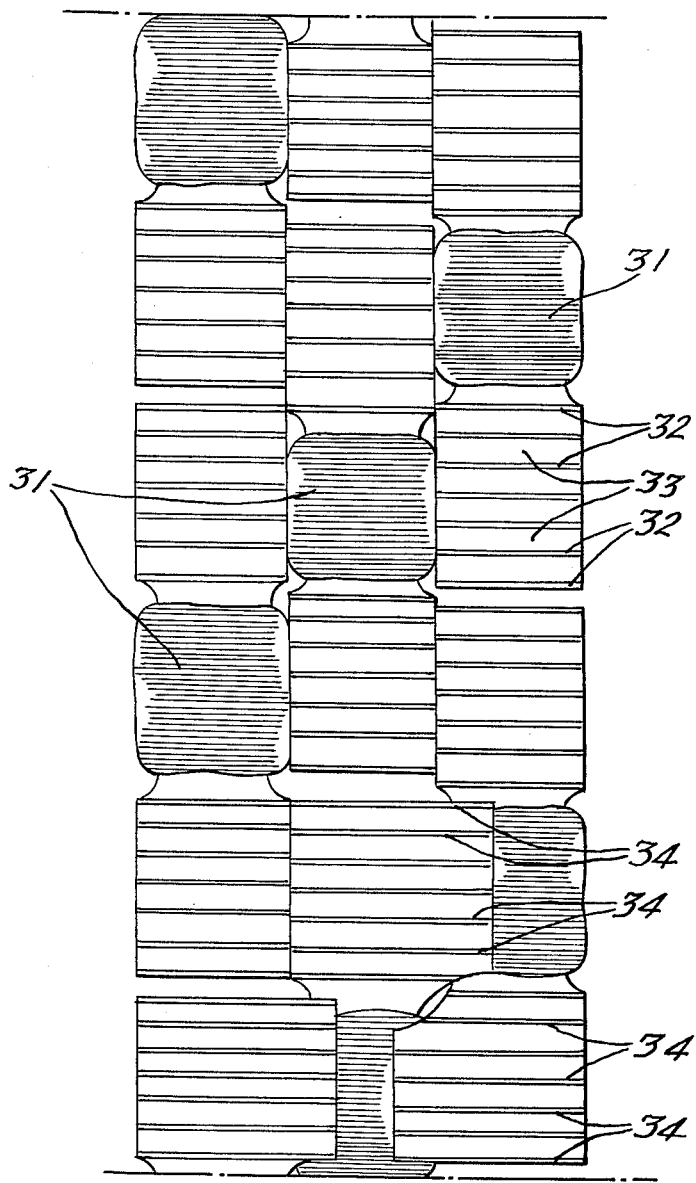
FIG. 3 shows the inner side of the stator according to FIG. 1 in a developed state.

FIG. 3 shows the displacement of the different windings 31 compared to each other. The lamination edges turned to the rotor cavity are denoted 32. The space between them is filled up by a plastic mass 33.

To have a greater part of the rotor used for each phase the lamination edges 34 have been made longer than the width of the lamination at the yoke so that the sections will overlap each other. In this way a smoother function of the motor is obtained at the same time as the flux and the turning moment are increased.

Figure 4:
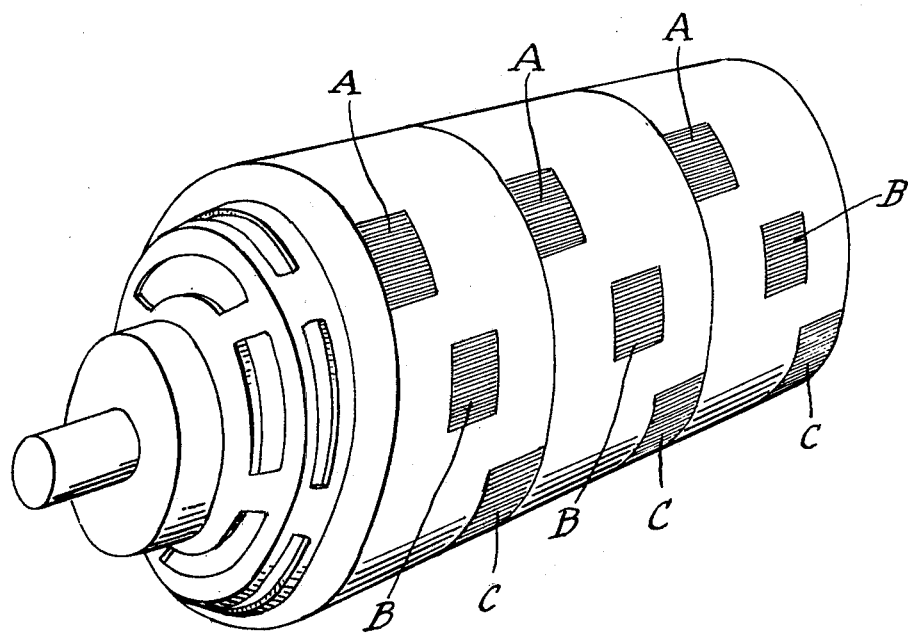
FIG. 4 shows a three phase motor having a greater number of stator sections than three.

FIG. 4 shows a perspective view of a three phase motor having nine different sections. Each phase is here represented by three different sections and have been denoted A, B, and C.

Figure 5:
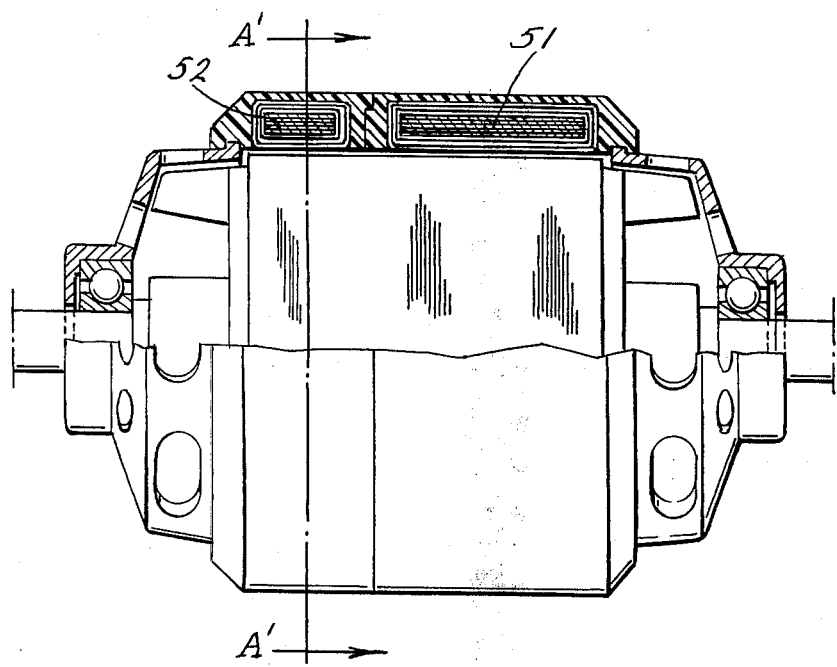
FIG. 5 shows a shaded pole motor partly in section.

FIG. 5 shows a shaded pole motor according to the invention with the salient pole 51 and the shaded pole 52. The shaded pole 52 may be firmly moulded to the salient pole 51, but it can also be arranged turnably in relation to this one. Even more shaded poles are possible for a long motor. They could be stationary or arranged turnably.

Figure 6:
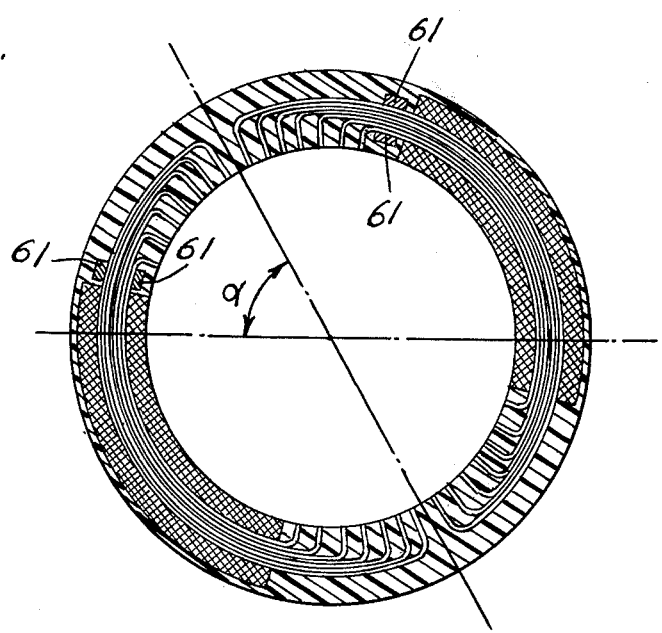
FIG. 6 shows a section along the line A—A in FIG. 5.

FIG. 6 shows finally a section along the line A—A through the shaded pole in FIG. 5. The shaded pole is arranged in the same way as the other sections, but short-circuited windings 61 have been inserted to bring about the desired turning moment. The shaded pole is magnetized in a usual way from the current in the main windings by means of a separate winding or optionally by means of a winding common with the salient pole.

The invention is not limited to the embodiment examples shown but may in different ways be varied within the scope of the claims. Thus, it is for instance possible that besides the shaded pole section the other stator sections are turnable in relation to each other, so that in this way it is possible to change the whole motor.

I claim:

1. Electric poly-phase motor comprising an annular stator assembly having a rotor cavity and a rotor rotatably mounted in the rotor cavity, said stator assembly comprising a plurality of axially directed, magnetically isolated sections each representing an electric phase and each including a plurality of superimposed laminations having side edge portions generally aligned with the axis of the rotor cavity and turned radially inwardly toward the rotor cavity, said side edge portions being circumferentially spaced relative to one another, windings surrounding the yoke portion of the laminations between the turned in side edge portions and a moulding mass encapsulating the laminations and windings and filling the space between the turned in side edge portions except for the outer terminal ends of said side edge portions.

2. Electric motor as claimed in claim 1, characterized in that the sections are stationary attached to each other.

3. Electric motor as claimed in claim 1, characterized in that it is a shaded pole motor in which at least one special section makes the shaded pole.

4. Electric motor as claimed in claim 1, characterized in that it is a polyphase motor.

5. Electric motor as claimed in claim 1 including three stator sections each displaced 120° el relative to one another.

6. Electric motor as claimed in claim 1 wherein the stator sections partly overlap one another in the axial direction.

7. Electric motor as claimed in claim 1 wherein the stator sections are movable circumferentially relative to one another.

8. Electric motor as claimed in claim 1 wherein the side edge portions are longer than the width of the laminations at the yoke so that the stator sections overlap one another.

* * * * *